(12) United States Patent
Sullivan

(10) Patent No.: US 8,442,980 B2
(45) Date of Patent: May 14, 2013

(54) ATTRIBUTE CHANGE COALESCING IN ORDER TO DEAL WITH COMPONENT MOVES ON A PAGE

(75) Inventor: Blake Sullivan, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/177,655

(22) Filed: Jul. 7, 2011

(65) Prior Publication Data

US 2013/0013600 A1   Jan. 10, 2013

(51) Int. Cl.
*G06F 7/00* (2006.01)
*G06F 17/30* (2006.01)

(52) U.S. Cl.
USPC .......................................... 707/736; 715/762

(58) Field of Classification Search .............. 707/737, 707/602, 609, 634; 715/209, 229, 234, 243, 715/249, 250, 252
See application file for complete search history.

(56) References Cited

U.S. PATENT DOCUMENTS

| | | | | |
|---|---|---|---|---|
| 6,473,081 B1 * | 10/2002 | Silva et al. | ..................... | 345/420 |
| 6,842,757 B1 * | 1/2005 | Winer et al. | ......................... | 1/1 |
| 2002/0070953 A1 * | 6/2002 | Barg et al. | ..................... | 345/700 |
| 2005/0235011 A1 * | 10/2005 | Minium et al. | ............... | 707/203 |
| 2006/0200751 A1 * | 9/2006 | Underwood et al. | ...... | 715/501.1 |
| 2006/0271390 A1 * | 11/2006 | Rich et al. | .......................... | 705/1 |
| 2007/0094672 A1 * | 4/2007 | Hayton et al. | ................. | 719/315 |
| 2007/0139441 A1 * | 6/2007 | Lucas et al. | .................... | 345/619 |
| 2007/0288890 A1 * | 12/2007 | Wells | ............................ | 717/113 |
| 2008/0307385 A1 * | 12/2008 | Dreiling et al. | ............... | 717/108 |
| 2009/0259950 A1 * | 10/2009 | Sullivan et al. | ................ | 715/762 |
| 2010/0222902 A1 * | 9/2010 | Eldridge et al. | ................ | 700/87 |
| 2010/0257457 A1 * | 10/2010 | De Goes | ....................... | 715/751 |

* cited by examiner

*Primary Examiner* — Robert Beausoliel, Jr.
*Assistant Examiner* — Nicholas Allen
(74) *Attorney, Agent, or Firm* — Kilpatrick Townsend & Stockton LLP

(57) ABSTRACT

Embodiments of the invention provide for applying multiple attribute changes to components of a dataset. According to one embodiment, coalescing changes can comprise reading a definition of the dataset. For example, the definition can comprise an identity and a context for each of the plurality of components. A component tree can be generated representing the data set and based on the context and identity. An indication of one or more changes to the components of the data set can be received and the changes can be classified based on a type of each of the changes. For example, the type of the changes can comprise one or more of a single component change, a cross-component change, and a cross-component change the affects the identity of at least one of the components The changes can be coalesced based on the type of the changes.

19 Claims, 6 Drawing Sheets

ATTRIBUTE CHANGE COALESCING IN ORDER TO DEAL WITH COMPONENT MOVES ON A PAGE

BACKGROUND OF THE INVENTION

Embodiments of the present invention relate generally to methods and systems for coalescing changes to a dataset and more particularly to methods and systems for coalescing and applying multiple attribute changes to components of a dataset such as components representing elements of a user interface.

Datasets can represent any of a wide variety different types of components. For example, a dataset can consist of components representing individual elements of a user interface. Furthermore, such a dataset can be logically organized in a structure such as a tree structure based on a hierarchy or other arrangement of the components. Changes can be made to the components of the dataset that affect individual components, multiple components, or even the structure of the dataset itself. For example, applications that use design time at runtime features to change the dataset relocate components in the tree, such as based on user input or instructions to move components in a design canvas or add container/child components from a catalog.

However, customizations involving multiple moves of a component, interspersed with attribute change customizations to this component, will lead to recording and restoring multiple attribute changes on the same component just because the composite id for the same target changed. Since there could be large number of attribute changes building up for the duration the user stays in a page, it would be a hit on performance to re-apply all these attribute change based customizations on the same component dealing with the same attribute. Hence, there is a need for improved methods and systems for applying multiple attribute changes to components of a dataset.

BRIEF SUMMARY OF THE INVENTION

Embodiments of the invention provide systems and methods for applying multiple attribute changes to components of a dataset such as components representing elements of a user interface. According to one embodiment, a method for coalescing changes to a data set can comprise reading a definition of the dataset. For example, the definition can comprise an identity and a context for each of the plurality of components. A component tree can be generated representing the data set and based on the context and identity. An indication of one or more changes to the components of the data set can be received and the changes can be classified based on a type of each of the changes. For example, the type of the changes can comprise one or more of a single component change, a cross-component change, and a cross-component change the affects the identity of at least one of the components The changes can be coalesced based on the type of the changes.

Coalescing the changes based on the type of the changes made can begin with determining whether a change comprises a cross-component change, i.e., the change affects a single component of the dataset or more than one component of the dataset. In response to determining a change of the one or more changes comprises a single-component change, the single component change can be saved under an original scoped identifier for the component affected and the saved changes for the component affected can be coalesced, i.e., attributes for the component can be saved to reflect the current state of the component.

In response to determining at least one change of the one or more changes comprises a cross-component change, a further determination can be made as to whether the identity of an affected component has been changed. In response to determining the cross-component change does not comprise a change to the identity of an affected component, the cross-component change can be saved in a change list for the whole dataset. In response to determining the cross-component change comprises a change to the identity of an affected component, a mapping from a current scoped identifier for an affected component to an original scoped identifier for the affected component can be updating and the cross-component change can be saved in the change list for the whole dataset.

The single component change to a representation of the dataset are saved to or under the original scoped identifier for the component and are thus applied when the component is created or generated. So, these changes need not be separately applied here. Therefore, applying coalesced changes to the dataset can begin with applying cross component changes, if any, by applying changes to the representation of the dataset based one the change list for the whole dataset. Other cross-component changes, if any, can be applied to the representation of the dataset based one the mapping from the current scoped identifier for the affected component to the original scoped identifier for the affected component and the change list for the whole dataset.

In one implementation, reading the definition of the dataset, generating the component tree, receiving the indication of one or more changes to the components, classifying the changes, and coalescing the changes are performed by a JavaServer Faces (JSF). In such a case, the definition of the dataset can comprise a JSF Facelet and the components of the dataset comprise definitions of components of a user interface. Receiving the indication of one or more changes to the components can comprise receiving through the user interface an indication of a user gesture.

According to another embodiment, a system can comprise a processor and a memory communicatively coupled with and readable by the processor. The memory can have stored therein a sequence of instructions which, when executed by the processor, causes the processor to coalesce changes to a data set by reading a definition of the dataset. The definition can comprise an identity and a context for each of the plurality of components. The instructions can further cause the processor to generate a component tree representing the data set and based on the context and identity, receive an indication of one or more changes to the components of the data set, classify the changes based on a type of each of the changes, and coalescing the changes based on the type of the changes.

The type of the changes can comprise one or more of a single component change, a cross-component change, and a cross-component change the affects the identity of at least one of the components. Coalescing the changes based on the type of the changes made can begin with determining whether a change comprises a cross-component change, i.e., the change affects a single component of the dataset or more than one component of the dataset. In response to determining a change of the one or more changes comprises a single-component change, the single component change can be saved under an original scoped identifier for the component affected and the saved changes for the component affected can be coalesced, i.e., attributes for the component can be saved to reflect the current state of the component. In response to determining at least one change of the one or more changes comprises a cross-component change, a further determination can be made as to whether the identity of an affected component has been changed. In response to determining the cross-component change does not comprise a change to the identity of an affected component, the cross-component change can be saved in a change list for the whole dataset. In response to determining the cross-component change comprises a change to the identity of an affected component, a mapping from a current scoped identifier for an affected component to an original scoped identifier for the affected component can be updating and the cross-component change can be saved in the change list for the whole dataset.

According to yet another embodiment, a machine-readable memory can have stored thereon a sequence of instructions which, when executed by a processor, cause the processor to coalesce changes to a data set by reading a definition of the dataset. The definition can comprise an identity and a context for each of the plurality of components. Coalescing changes can further comprise generating a component tree representing the data set and based on the context and identity, receiving an indication of one or more changes to the components of the data set, classifying the changes based on a type of each of the changes, and coalescing the changes based on the type of the changes, wherein the type of the changes comprises one or more of a single component change, a cross-component change, and a cross-component change the affects the identity of at least one of the components.

Coalescing the changes based on the type of the changes can comprise determining a change of the one or more changes comprises a single-component change, saving the single component change under an original scoped identifier for the component affected, and coalescing saved changes for the component affected. Additionally or alternatively, coalescing the changes based on the type of the changes can comprise determining at least one change of the one or more changes comprises a cross-component change, determining whether the cross-component change comprise a change to the identity of an affected component, in response to determining the cross-component change does not comprise a change to the identity of an affected component, saving the cross-component change in a change list for the whole dataset, and in response to determining the cross-component change comprises a change to the identity of an affected component, updating a mapping from a current scoped identifier for an affected component to an original scoped identifier for the affected component and saving the cross-component change in a change list for the whole dataset.

DETAILED DESCRIPTION OF THE INVENTION

Figure 1:
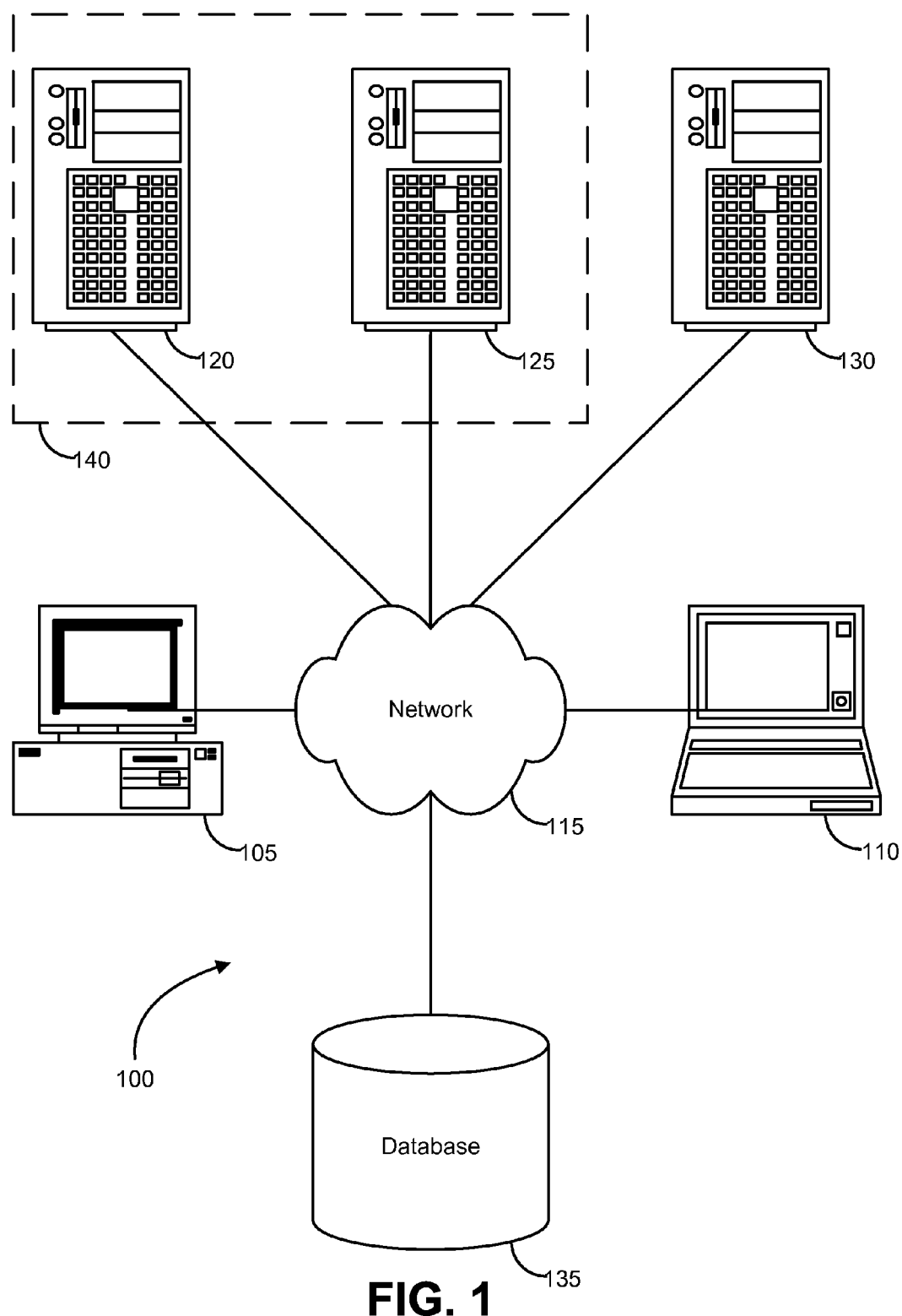
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for coalescing and applying multiple attribute changes to components of a dataset. More specifically, embodiments of the present invention provide for classifying a change based on whether it applies to a single component of the dataset, applies across multiple components of the dataset, or applies across multiple components and also affects an identity of a component of the dataset. Based on the changes being classified as one of these different types, the changes can be coalesced and stored so that later application of these changes to the stored dataset can be performed more efficiently by reducing the number of operations needed to apply the changes.

For example, embodiments of the present invention are thought to be useful in implementations using JavaServer Faces (JSF) and a dataset in which the components thereof represent elements of a user interface. Therefore, examples are provided herein, for illustrative purposes only, that are directed to such an implementation. However, it should be understood that embodiments of the present invention are not limited to implementations with JSF or any other particular type of data or dataset. Rather, embodiments of the present invention are thought to be applicable to a wide variety of different environments and different types of datasets wherein the components of the dataset are defined in terms of identity and context. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
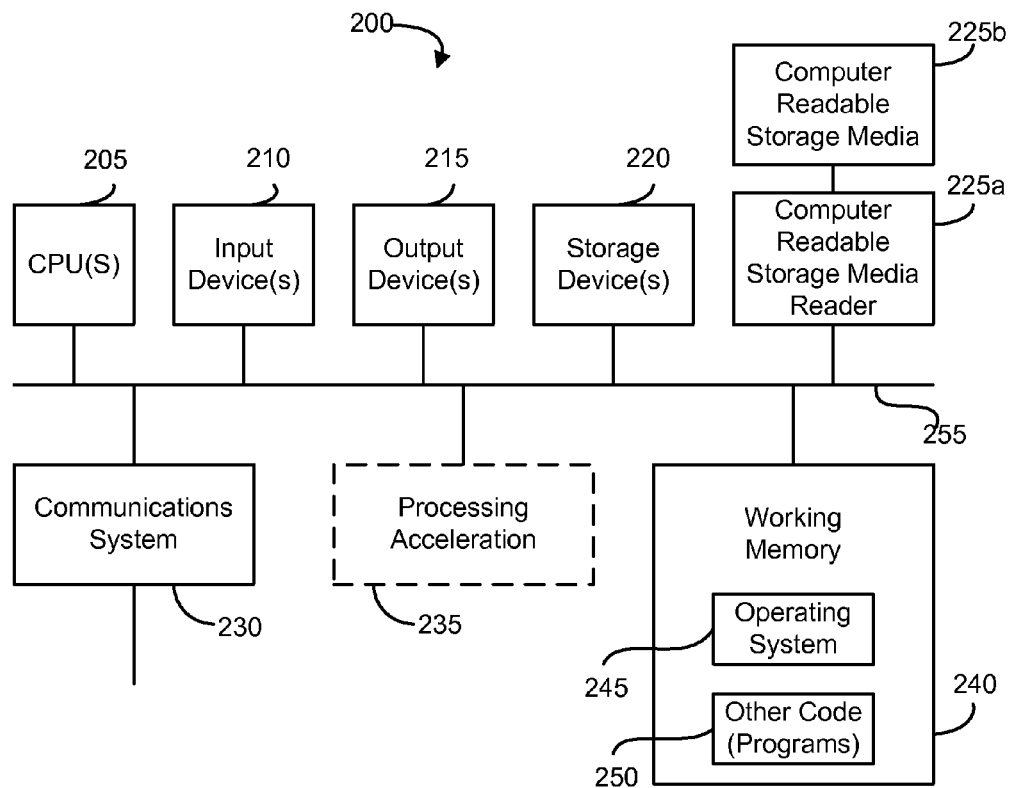
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a Digital Signal Processor (DSP), a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

As noted above, embodiments of the invention provide systems and methods for coalescing and applying multiple attribute changes to components of a dataset. Embodiments of the present invention are thought to be useful in implementations using JavaServer Faces (JSF) and a dataset in which the components thereof represent elements of a user interface. Therefore, the following example is provided for illustrative purposes. However, it should be understood that embodiments of the present invention are not limited to implementations with JSF or any particular type of data or dataset. Rather, embodiments of the present invention are thought to be applicable to a wide variety of different environments and different types of datasets wherein the components of the dataset are defined in terms of identity and context.

Figure 3:
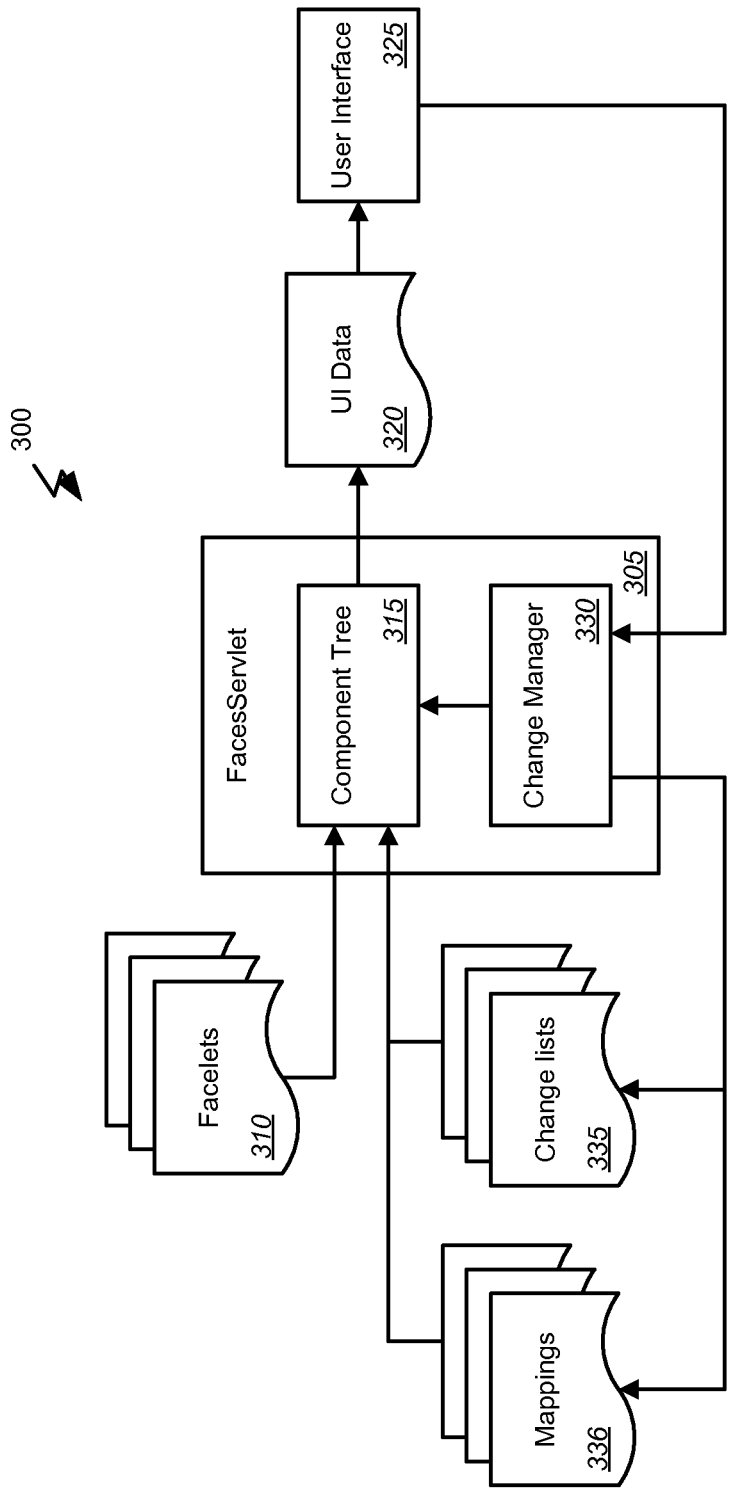
FIG. 3 is a block diagram illustrating, at a high-level, functional components of a system for coalescing changes to a dataset according to one embodiment of the present invention.

FIG. 3 is a block diagram illustrating, at a high-level, functional components of a system for coalescing changes to a dataset according to one embodiment of the present invention. In this example, the system 300 can execute a JSF FacesServlet 305. As commonly understood, the FacesServlet 305 implements a Java-based web application framework that uses view templates or Facelet views 310 that are XML files defining a set of components for a user interface such as a web page. The Facelet view 310 for a particular page defines attributes for each component thereof including an identity and a context. Upon receiving a request for a page to be rendered, the FacesServlet 305 loads the Facelet view 310 for that page and builds a component tree 315 representing the components defined in the template. The FacesServlet 305 can then, based on the component tree 315 generate and provide user interface data 320, e.g., an HyperText Markup Language (HTML) representation of the page, to be rendered as a user interface 325, for example through a browser application.

Runtime customization in JSF are usually implemented through changes to component attributes. These changes are often caused due to end user gestures on the user interface 325. Applications that use such design time at runtime features relocate JSF components in the component tree 315 due to gestures like drag and drop of component in the user interface 325 or addition of container/child components from a catalog. Such component relocations are also customizations, and their storage and restoration to and from a change list 335 are managed by a change manager 330 along with the attribute change based customizations. Such frequent component relocations will cause change in the composite id of the target component, even though the component actually remained the same. Customization change objects often use the composite id to locate components that are targets of a customization.

Customizations involving multiple moves of a component, interspersed with attribute change customizations to this component, will lead to recording and restoring multiple attribute changes on the same component just because the composite id for the same target changed. Since there could be large number of attribute changes building up for the duration the user stays in a page, it would be a hit on performance to re-apply all these attribute changes based customizations on the same component dealing with the same attribute.

Currently, the change manager 330 maintains a single change list 335 of changes to be applied and applies them in order. While the change manager 330 and change list 335 can support collapsing attribute changes even across component moves, this approach has some performance limitations in and of itself and decreases the ability to make other performance improvements. First, this is due to some changes affecting multiple components. In such cases, the change manager 330 waits to the end of the document tag to apply the changes (so that all components exist). Unfortunately, this means that when the tags are executing, they don't actually have any values that were modified by a change available to them. This prevents application of optimizations where the FacesServlet 305 does not execute the tags that are sub-trees that won't be visited by the lifecycle (for example undisclosed tabs). Additionally, because the changes are not applied at the time of tag execution, separate operations, i.e., findComponent() call, are performed for each change to be applied. This can get expensive for large numbers of changes.

Embodiments of the present invention provide for classifying a change based on whether it applies to a single component of the dataset, applies across multiple components of the dataset, or applies across multiple components and also affects an identity of a component of the dataset. Based on the changes being classified as one of these different types, the changes can be coalesced and stored so that later application of these changes to the stored dataset can be performed more efficiently by reducing the number of operations needed to apply the changes. For example, changes that are applied to a single component are saved under the component's original scoped identifier and the collapsible changes are collapsed. Cross-component changes are maintained in a single page wide list of the changes lists 335. Cross-component changes that change the identify of a component update a mapping from the new (current scoped identifier) for the component to the original scoped identifier also stored in the change lists 335 so that as new changes are applied, they are applied to the correct entry in the component's original scoped identifier. For efficiency, the serialized form of the changes is a single list of changes in the change lists 335 with collapsible entries collapsed, even across changes that change the identity. The rename maps and a single component changes can be rebuilt on demand from this single list.

As a result, the single component changes can be applied to a component at tag execution time by the FacesServlet 305, even if that component had a change that moved it. This allows for optimizations by the FacesServlet 305 where child tags are not executed. Since collapsible changes, like attribute changes are collapsed by the change manager 330, fewer changes are applied by the FacesServlet 305 and only the rare, cross-component changes are applied using separate operations, i.e., findComponent calls.

Stated another way, coalescing changes to a dataset such as represented by the Facelet view 310 can begin with the FacesServlet 305 reading a definition of the dataset from the Facelet view 310. The definition can comprise an identity and a context for each of the plurality of components. A component tree 315 representing the dataset can be generated by the FacesServlet 305 based on the context and identity of each component. The FacesServlet 305 can then, based on the component tree 315 generate and provide user interface data 320, e.g., an HyperText Markup Language (HTML) representation of the page, to be rendered as a user interface 325, for example through a browser application.

An indication of one or more changes to the components of the dataset can be receiving by the FacesServlet 305 and classified by the change manager 330 based on a type of each of the changes. For example, the FacesServlet can receive instructions indicating a relocation of one or more components in the component tree 315 due to gestures like drag and drop of component in the user interface 325. The type of the changes can comprise one or more of a single component change, a cross-component change, and a cross-component change that affects the identity of at least one of the components. The changes can be coalesced by the change manager 330 based on the type of the changes made.

Coalescing the changes based on the type of the changes made can begin with the change manager 330 determining whether a change comprises a cross-component change, i.e., the change affects a single component of the dataset or more than one component of the dataset. In response to determining a change of the one or more changes comprises a single-component change, the change manager 330 can save the single component change under an original scoped identifier for the component affected and coalesce the saved changes for the component affected, i.e., attributes for the component can be saved to reflect the current state of the component.

In response to determining at least one change of the one or more changes comprises a cross-component change, the change manager 330 can make a further determination as to whether the identity of an affected component has been changed. In response to determining the cross-component change does not comprise a change to the identity of an affected component, the change manager 330 can save the cross-component change in a change list 335 for the whole dataset. In response to determining the cross-component change comprises a change to the identity of an affected component, the change manager 330 can update a mapping 336 from a current scoped identifier for an affected component to an original scoped identifier for the affected component and the cross-component change can be saved in the change list 335 for the whole dataset.

Applying coalesced changes to the dataset can begin with the FacesServlet 305 applying the single component change to a representation of the dataset, i.e., the component tree 315, based one the coalesced set of saved changes. That is, those single component changed saved to or under the original scoped identifier for the component can be applied to the component tree 315 and/or a graphical representation of the dataset such as defined by the user interface data 320. Cross component changes, if any, can be applied by the FacesServlet 305 applying changes to the component tree 315 based one the change list 335 for the whole dataset. Other cross-component changes, if any, can be applied to the component tree 315 by the FacesServlet 305 based one the mapping 336 from the current scoped identifier for the affected component to the original scoped identifier for the affected component and the change list 335 for the whole dataset.

Figure 4:
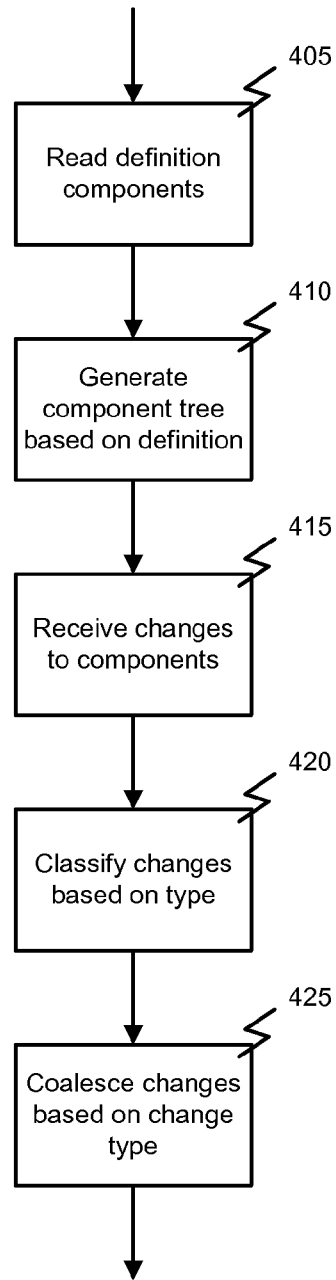
FIG. 4 is a flowchart illustrating a process for coalescing changes to a dataset according to one embodiment of the present invention.

FIG. 4 is a flowchart illustrating a process for coalescing changes to a dataset according to one embodiment of the present invention. In this example, coalescing changes to a data set can begin with reading 405 a definition of the dataset. The definition can comprise an identity and a context for each of the plurality of components. A component tree representing the data set can be generated 410 based on the context and identity of each component. An indication of one or more changes to the components of the data set can be receiving 415 and classified 420 based on a type of each of the changes. For example, the type of the changes can comprise one or more of a single component change, a cross-component change, and a cross-component change the affects the identity of at least one of the components. The changes can be coalesced based on the type of the changes made.

Figure 5:
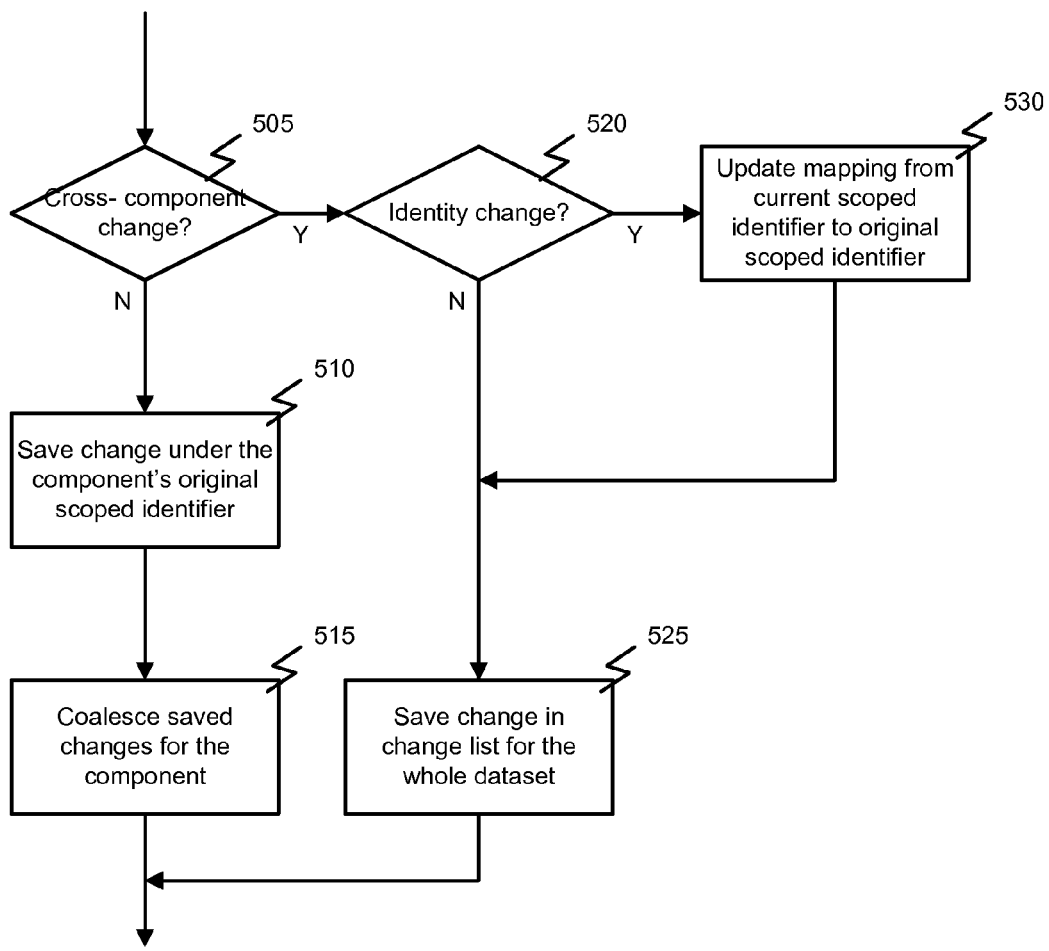
FIG. 5 is a flowchart illustrating a process for coalescing changes to a dataset according to one embodiment of the present invention.

FIG. 5 is a flowchart illustrating a process for coalescing changes to a dataset according to one embodiment of the present invention. In this example, coalescing the changes based on the type of the changes made can begin with determining 505 whether a change comprises a cross-component change, i.e., the change affects a single component of the dataset or more than one component of the dataset. In response to determining 505 a change of the one or more changes comprises a single-component change, the single component change can be saved 510 under an original scoped identifier for the component affected and the saved changes for the component affected can be coalesced, i.e., attributes for the component can be saved to reflect the current state of the component.

In response to determining 505 at least one change of the one or more changes comprises a cross-component change, a further determination 520 can be made as to whether the identity of an affected component has been changed. In response to determining 520 the cross-component change does not comprise a change to the identity of an affected component, the cross-component change can be saved 525 in a change list for the whole dataset. In response to determining 520 the cross-component change comprises a change to the identity of an affected component, a mapping from a current scoped identifier for an affected component to an original scoped identifier for the affected component can be updating 530 and the cross-component change can be saved 525 in the change list for the whole dataset.

Figure 6:
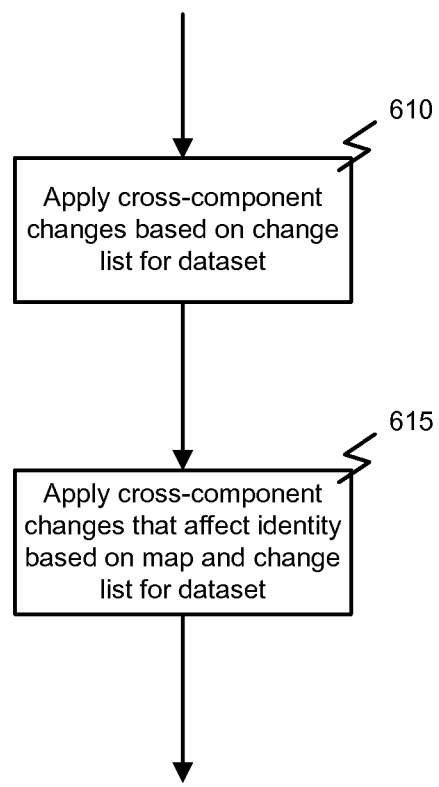
FIG. 6 is a flowchart illustrating a process for applying coalesced changes to a dataset according to one embodiment of the present invention.

FIG. 6 is a flowchart illustrating a process for applying coalesced changes to a dataset according to one embodiment of the present invention. As noted above, the single component change to a representation of the dataset are saved to or under the original scoped identifier for the component and are thus applied when the component is created or generated, i.e., see element 410 of FIG. 4 discussed above, and so, these changes need not be separately applied here. Therefore, applying coalesced changes to the dataset can begin with applying 610 cross component changes, if any, by applying changes to the representation of the dataset based one the change list for the whole dataset. That is, the component changes that apply to more than one component but that do not change an identity of an affected component can be applied based on the change list for the dataset. Other cross-component changes, if any, can be applied 615 to the representation of the dataset based one the mapping from the current scoped identifier for the affected component to the original scoped identifier for the affected component and the change list for the whole dataset. That is, the component changes that apply to more than one component and that also change an identity of an affected component can be applied based on the identifier mapping and the change list for the dataset.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for coalescing changes to a data set, the method comprising:
reading a definition of the dataset, wherein the definition comprises an identity and a context for each of a plurality of components;
generating a component tree representing the data set and based on the context and identity;
receiving an indication of one or more changes to the components of the data set;
determining a type of each of the changes based on the indication of the one or more changes and the component tree representing the data set, wherein the type of the changes comprises one or more of a single component change, a cross-component change, and a cross-component change the affects the identity of at least one of the components;
classifying the changes based on the type of each of the changes; and
coalescing the changes based on the type of the changes; and
applying the coalesced changes to the data set based on the type of the coalesced changes.

2. The method of claim 1, wherein coalescing the changes based on the type of the changes comprises:
determining a change of the one or more changes comprises a single-component change;
saving the single component change under an original scoped identifier for the component affected; and
coalescing saved changes for the component affected.

3. The method of claim 2, wherein coalescing the changes based on the type of the changes further comprises determining at least one change of the one or more changes comprises a cross-component change.

4. The method of claim 3, wherein coalescing the changes based on the type of the changes further comprises:
determining the cross-component change does not comprise a change to the identity of an affected component; and
saving the cross-component change in a change list for the whole dataset.

5. The method of claim 3, wherein coalescing the changes based on the type of the changes further comprises:
determining the cross-component change comprises a change to the identity of an affected component;
updating a mapping from a current scoped identifier for an affected component to an original scoped identifier for the affected component; and
saving the cross-component change in a change list for the whole dataset.

6. The method of claim 2, further comprising applying the single component change to a representation of the dataset based one the coalesced set of saved changes.

7. The method of claim 4, further comprising applying the cross-component change to a representation of the dataset based one the change list for the whole dataset.

8. The method of claim 5, further comprising applying the cross-component change to a representation of the dataset based one the mapping from the current scoped identifier for the affected component to the original scoped identifier for the affected component and the change list for the whole dataset.

9. The method of claim 1, wherein reading the definition of the dataset, generating the component tree, receiving the indication of one or more changes to the components, classifying the changes, and coalescing the changes are performed by a JavaServer Faces (JSF).

10. The method of claim 9, wherein the definition of the dataset comprises a JSF Facelet and the components of the dataset comprise definitions of components of a user interface.

11. The method of claim 10, wherein receiving the indication of one or more changes to the components comprises receiving through the user interface an indication of a user gesture.

12. A system comprising:
a processor; and
a memory communicatively coupled with and readable by the processor and having stored therein a sequence of instructions which, when executed by the processor, causes the processor to coalesce changes to a data set by reading a definition of the dataset, wherein the definition comprises an identity and a context for each of a plurality of components, generating a component tree representing the data set and based on the context and identity, receiving an indication of one or more changes to the components of the data set, determining a type of each of the changes based on the indication of the one or more changes and the component tree representing the data set, classifying the changes based on the type of each of the changes, and coalescing the changes based on the type of the changes, and applying the coalesced changes to the data set based on the type of the coalesced changes, wherein the type of the changes comprises one or more of a single component change, a cross-component change, and a cross-component change the affects the identity of at least one of the components.

13. The system of claim 12, wherein coalescing the changes based on the type of the changes comprises:
   determining a change of the one or more changes comprises a single-component change;
   saving the single component change under an original scoped identifier for the component affected; and
   coalescing saved changes for the component affected.

14. The system of claim 13, wherein coalescing the changes based on the type of the changes further comprises determining at least one change of the one or more changes comprises a cross-component change.

15. The system of claim 14, wherein coalescing the changes based on the type of the changes further comprises:
   determining the cross-component change does not comprise a change to the identity of an affected component; and
   saving the cross-component change in a change list for the whole dataset.

16. The system of claim 14, wherein coalescing the changes based on the type of the changes further comprises:
   determining the cross-component change comprises a change to the identity of an affected component;
   updating a mapping from a current scoped identifier for an affected component to an original scoped identifier for the affected component; and
   saving the cross-component change in a change list for the whole dataset.

17. A machine-readable memory device having stored thereon a sequence of instructions which, when executed by a processor, cause the processor to coalesce changes to a data set by:
   reading a definition of the dataset, wherein the definition comprises an identity and a context for each of a plurality of components;
   generating a component tree representing the data set and based on the context and identity;
   receiving an indication of one or more changes to the components of the data set;
   determining a type of each of the changes based on the indication of the one or more changes and the component tree representing the data set;
   classifying the changes based on the type of each of the changes; and
   coalescing the changes based on the type of the changes, wherein the type of the changes comprises one or more of a single component change, a cross-component change, and a cross-component change the affects the identity of at least one of the components: and
   applying the coalesced changes to the data set based on the type of the coalesced changes.

18. The machine-readable memory device of claim 17, wherein coalescing the changes based on the type of the changes comprises:
   determining a change of the one or more changes comprises a single-component change;
   saving the single component change under an original scoped identifier for the component affected; and
   coalescing saved changes for the component affected.

19. The machine-readable memory device of claim 18, wherein coalescing the changes based on the type of the changes further comprises:
   determining at least one change of the one or more changes comprises a cross-component change;
   determining whether the cross-component change comprise a change to the identity of an affected component;
   in response to determining the cross-component change does not comprise a change to the identity of an affected component, saving the cross-component change in a change list for the whole dataset; and
   in response to determining the cross-component change comprises a change to the identity of an affected component, updating a mapping from a current scoped identifier for an affected component to an original scoped identifier for the affected component and saving the cross-component change in a change list for the whole dataset.

* * * * *

UNITED STATES PATENT AND TRADEMARK OFFICE
CERTIFICATE OF CORRECTION

| | | |
|---|---|---|
| PATENT NO. | : 8,442,980 B2 | Page 1 of 1 |
| APPLICATION NO. | : 13/177655 | |
| DATED | : May 14, 2013 | |
| INVENTOR(S) | : Sullivan | |

It is certified that error appears in the above-identified patent and that said Letters Patent is hereby corrected as shown below:

On Title page, in column 2, under "Abstract", line 13-14, after "components" insert -- . --.

In the Specification:

In column 1, line 55, after "components" insert -- . --.

In column 2, line 22, delete "one" and insert -- on --, therefor.

In column 2, line 24, delete "one" and insert -- on --, therefor.

In column 8, line 55, delete "findComponent()" and insert -- findComponent --, therefor.

In column 10, line 9, delete "one" and insert -- on --, therefor.

In column 10, line 15, delete "one" and insert -- on --, therefor.

In column 10, line 18, delete "one" and insert -- on --, therefor.

In column 11, line 8, delete "one" and insert -- on --, therefor.

In column 11, line 14, delete "one" and insert -- on --, therefor.

In the Claims:

In column 12, line 32, in Claim 6, delete "one" and insert -- on --, therefor,

In column 12, line 35, in Claim 7, delete "one" and insert -- on --, therefor.

In column 12, line 38, in Claim 8, delete "one" and insert -- on --, therefor.

In column 14, line 14, in Claim 17, delete "components:" and insert -- components; --, therefor.

Signed and Sealed this
Seventeenth Day of September, 2013

Teresa Stanek Rea
*Deputy Director of the United States Patent and Trademark Office*